United States Patent
Ohama et al.

(10) Patent No.: US 10,999,456 B2
(45) Date of Patent: May 4, 2021

(54) IMAGE READING DEVICE

(71) Applicant: Mitsubishi Electric Corporation, Chiyoda-ku (JP)

(72) Inventors: Daisuke Ohama, Chiyoda-ku (JP); Hideki Kunishio, Chiyoda-ku (JP); Masaaki Okada, Chiyoda-ku (JP); Yuki Okuhigashi, Chiyoda-ku (JP); Masahiko Takashina, Chiyoda-ku (JP); Masaki Wakisaka, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/618,686

(22) PCT Filed: Dec. 7, 2018

(86) PCT No.: PCT/JP2018/045071
§ 371 (c)(1),
(2) Date: Dec. 2, 2019

(87) PCT Pub. No.: WO2019/138750
PCT Pub. Date: Jul. 18, 2019

(65) Prior Publication Data
US 2020/0382666 A1    Dec. 3, 2020

(30) Foreign Application Priority Data

Jan. 11, 2018  (JP) .............................. JP2018-002415

(51) Int. Cl.
*G06F 3/12*    (2006.01)
*H04N 1/00*   (2006.01)
(Continued)

(52) U.S. Cl.
CPC ....... *H04N 1/00519* (2013.01); *H04N 1/0288* (2013.01); *H04N 1/02855* (2013.01); *H04N 1/1936* (2013.01)

(58) Field of Classification Search
CPC .......... H04N 1/00519; H04N 1/02855; H04N 1/0288; H04N 1/02885; H04N 1/1936
See application file for complete search history.

(56) References Cited

U.S. PATENT DOCUMENTS

| | | | |
|---|---|---|---|
| 2012/0154877 A1 | 6/2012 | Kisara et al. | |
| 2015/0136951 A1* | 5/2015 | Ohama | H04N 1/1936 250/208.1 |
| 2015/0381848 A1* | 12/2015 | Matsui | H04N 1/193 358/482 |

FOREIGN PATENT DOCUMENTS

| | | |
|---|---|---|
| JP | 2010-124291 A | 6/2010 |
| JP | 2012-129947 A | 7/2012 |

(Continued)

OTHER PUBLICATIONS

International Search Report dated Mar. 12, 2019 in PCT/JP2018/045071 filed Dec. 7, 2018, 1 page.

*Primary Examiner* — Moustapha Diaby
(74) *Attorney, Agent, or Firm* — Oblon, McClelland, Maier & Neustadt, L.L.P.

(57) ABSTRACT

An image reading device includes light guides (5, 6) that emit light to an object to be read, a lens body (8) that condenses reflected light, a light receiver (13) that receives the reflected light, a sensor board (24) on which is mounted the light receiver (13), a lens holder (11), and a housing (9) that houses or holds these components. The lens holder (11) includes a holder bottom (11*g*), light guide positioners (11*a*, 11*b*) and lens body holders (11*e*, 11*f*). In the lens holder (11), the lens body (8) is attached between the lens body holders (11*e*, 11*f*), the sensor board (24) is attached to the holder (Continued)

bottom (11*g*) such that the light receiver (13) aligns with an optical axis of the lens body (8), and the light guides (5, 6) are attached to the light guide positioners (11*a*, 11*b*). A surface of each light guide positioner (11*a*, 11*b*) that faces the corresponding light guide (5, 6) to be attached has at least a portion having a same shape a s a shape of a surface of the light guide.

11 Claims, 11 Drawing Sheets

(51) Int. Cl.
　　　*H04N 1/028*　　　(2006.01)
　　　*H04N 1/193*　　　(2006.01)

(56) References Cited

FOREIGN PATENT DOCUMENTS

| | | | |
|---|---|---|---|
| JP | 2012-175421 A | | 9/2012 |
| JP | 2017-38110 A | | 2/2017 |
| JP | 2017038110 A | * | 2/2017 |

* cited by examiner

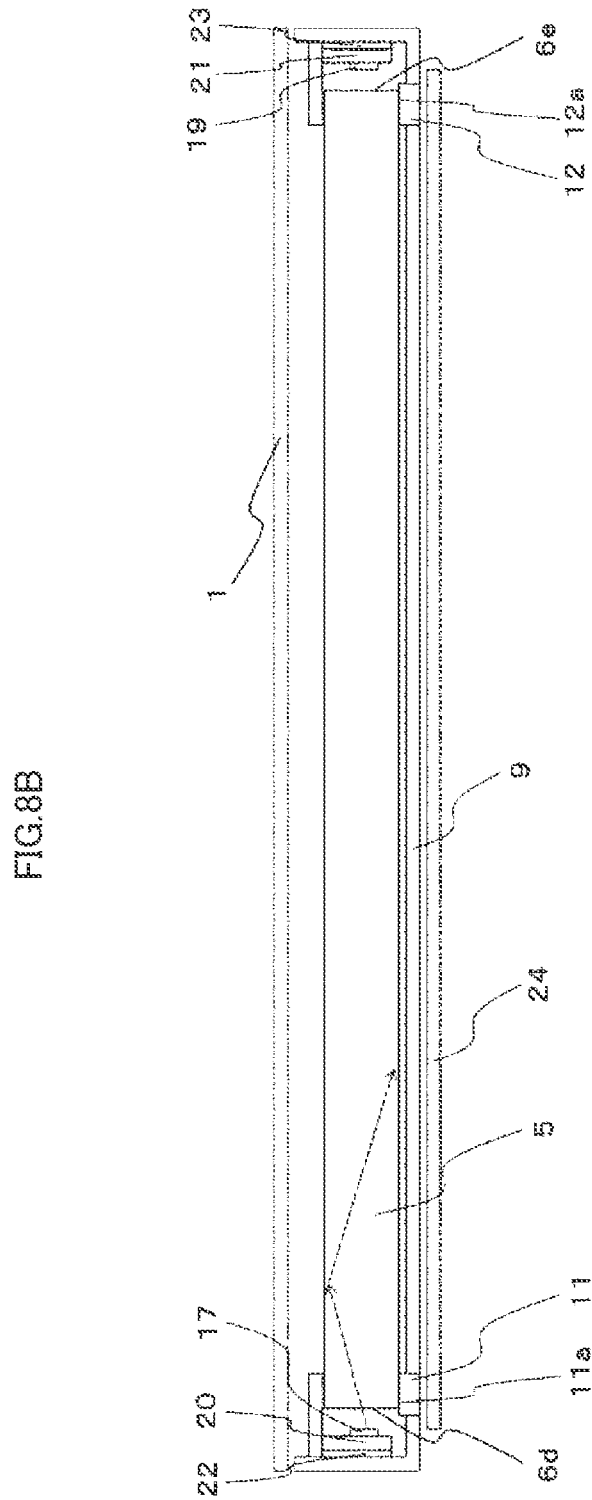

IMAGE READING DEVICE

TECHNICAL FIELD

The present disclosure relates to an image reading device for reading an image of a document, the image reading device being used in a copier, a digital multifunctional printer or the like.

BACKGROUND ART

Optical systems used in image reading devices are to have, due to an increase in resolution of a copier or the like and demand for uniformity of reading depth, a configuration that enables uniform irradiation with light in a longitudinal direction that is a main scanning direction and highly accurately regulates relative positional relationships of a document, a lens body and a light receiver sensor. For example, Patent Literature 1 discloses an image sensor having a configuration in which a position of a lens body is adjusted by inserting the lens body into openings of lens body fixing portions included in a housing that is made of a sheet metal, positioning the lens body using a jig or the like, and fixing the lens body to the housing using a light shield.

CITATION LIST

Patent Literature

Patent Literature 1: Unexamined Japanese Patent Application Kokai Publication No. 2017-38110

SUMMARY OF INVENTION

Technical Problem

Patent Literature 1, however, does not disclose a configuration to maintain high accuracy of relative positional relationships of a light guide for illuminating a document with light, a lens body, and a light receiver, and thus employing the image sensor of Patent Literature 1 may lead to occurrence of variances in image reading performance and resolution of an image.

In order to solve the aforementioned problems, an objective of the disclosure is to obtain an image reading device that prevents variances in the image reading performance and resolution of an image.

Solution to Problem

An image reading device according to the present disclosure includes:

a light guide extending in a main scanning direction and configured to emit light to an object to be read;

a lens body to focus reflected light reflected by the object to be read:

a light receiver to receive the reflected light focused by the lens body:

a sensor board on which the light receiver is mounted;

lens holders on which the light guide, the lens body, and the sensor board are mounted; and a housing to house or hold the light guide, the lens body, the sensor board, and the lens holders, wherein the lens holders are disposed at both ends of the housing in the main scanning direction and each include a holder bottom, a light guide positioner, and lens body holders, the lens body is mounted on pairs of the lens body holders, each pair being provided upwards from the corresponding holder bottom toward the object to be read and extending in the main scanning direction, the sensor board is mounted on the holder bottoms such that the light receiver aligns with an optical axis of the lens body, the light guide is attached to the light guide positioners, the light guide positioners each comprising the lens body holder and a holder bottom protrusion continuous with the lens body holder and protruding in a sub-scanning direction from an intersection of the holder bottom with the lens body holder, and a surface of each light guide positioner that faces the light guide to be attached has at least a portion having a same shape as a shape of a surface of the light guide.

Advantageous Effects of Invention

The present disclosure enables obtaining of an image reading device that prevents variances in the image reading performance and resolution of an image.

BRIEF DESCRIPTION OF DRAWINGS

FIG. 8B is a cross-sectional view illustrating the image reading device according to Embodiment 1 in the main scanning direction, taken along a line G-GI of FIG. 5;

DESCRIPTION OF EMBODIMENTS

Embodiment 1

Figure 1:
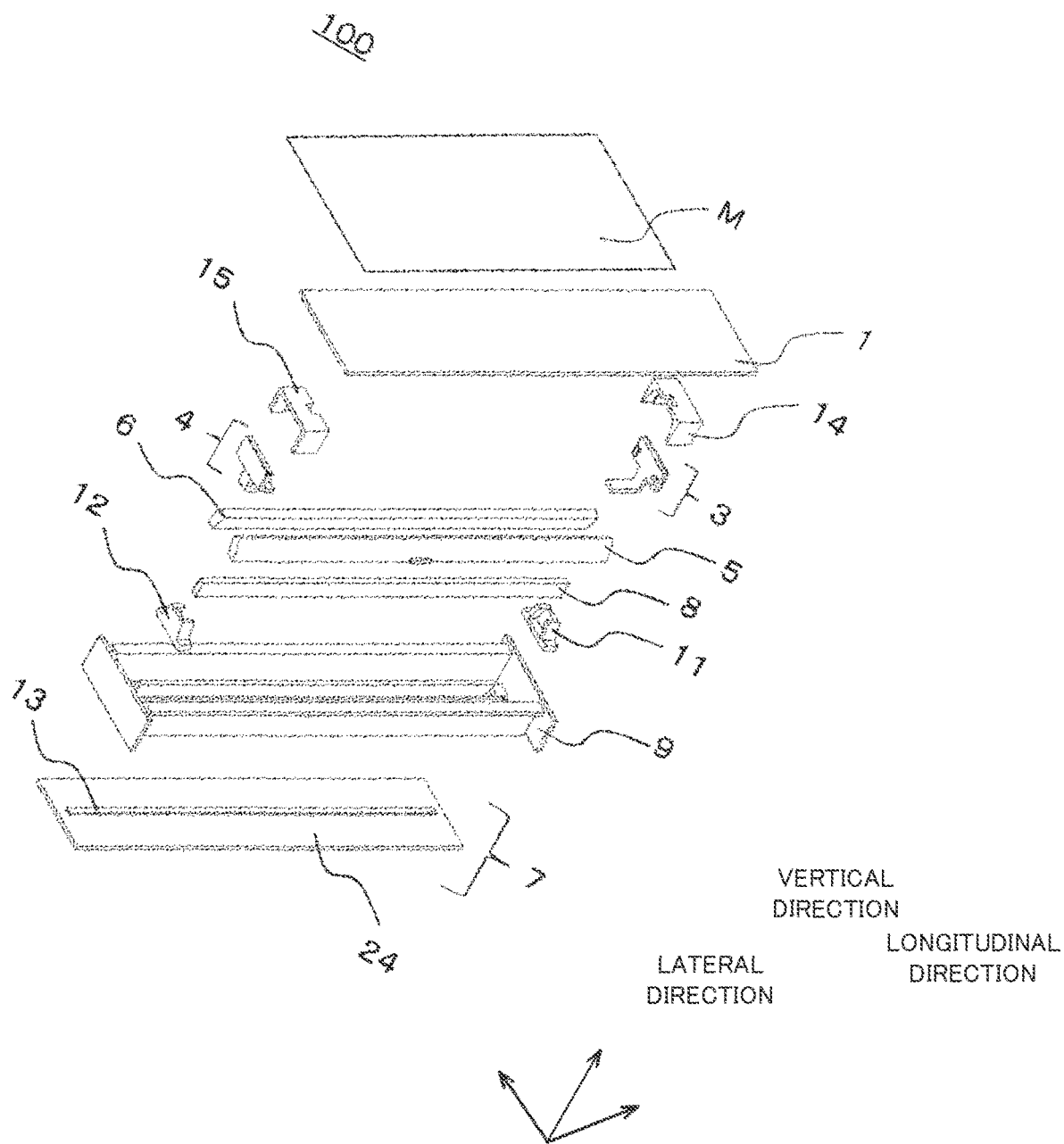
FIG. 1 is an exploded perspective view of an image reading device according to Embodiment 1.

Embodiment 1 of the present disclosure is explained with reference to FIG. 1 to FIG. 10. FIG. 1 is an exploded perspective view of an image reading device according to Embodiment 1. In FIG. 1, a document M is an object to be read by an image reading device 100. The document M is in contact with a transparent plate 1 such that a reading surface of the document M faces the transparent plate 1. A non-illustrated conveying mechanism conveys the document M to the image reading device 100. The image reading device 100 reads an image of the document M in contact with the transparent plate 1. A main scanning direction, a sub-scanning direction, and a vertical direction shown in FIG. 1 are defined as follows: the main scanning direction is the longitudinal direction of the image reading device 100, the sub-scanning direction is the lateral direction of the image reading device 100, and the vertical direction is the direction of the normal line of the reading surface of the document M and also is the direction of the normal of the transparent plate 1. The vertical direction is orthogonal to both the main scanning direction and the sub-scanning direction.

The image reading device 100 includes light guides 5 and 6 that emit light entering from both ends of the image reading device 100 in the main scanning direction onto the reading surface of the document M, a lens unit that condenses reflected light reflected by the reading surface, light source units 3 and 4 projecting light into the corresponding end of both ends of the light guides 5 and 6 in the main scanning direction, and a sensor unit 7 that receives the light condensed and focused by the lens unit.

Figure 2:
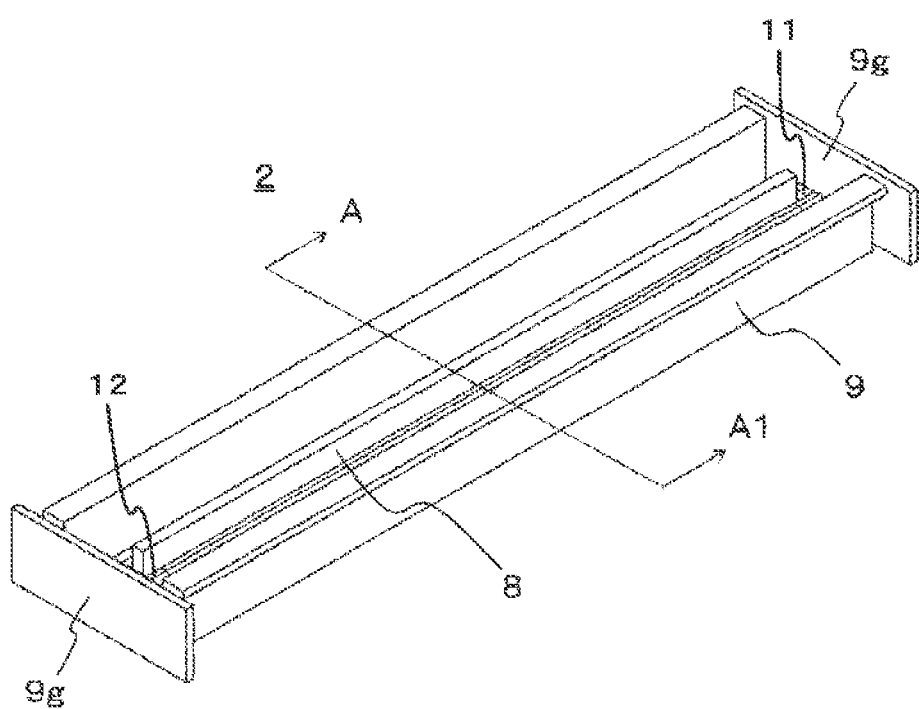
FIG. 2 is a perspective view of a lens unit according to Embodiment 1.
Figure 3:
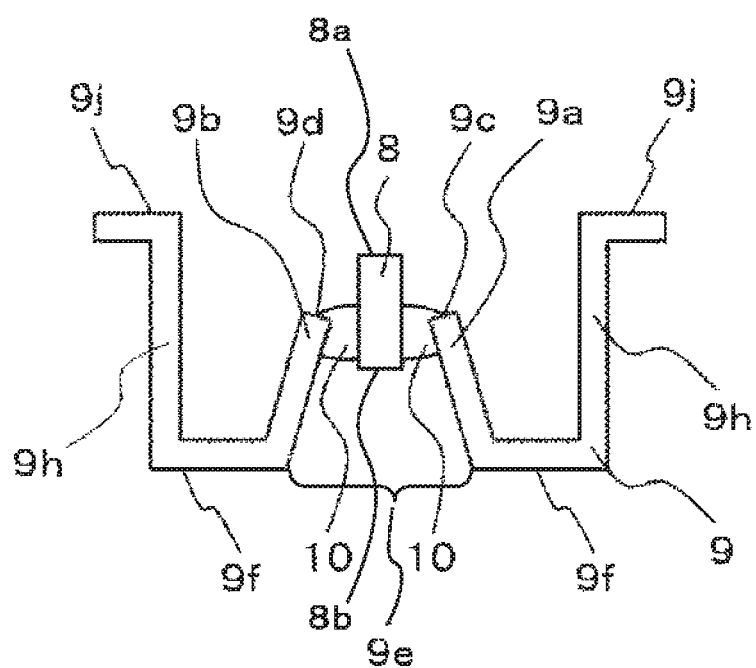
FIG. 3 is a cross-sectional view illustrating the lens unit according to Embodiment 1 in a sub-scanning direction, taken along a line A-A1 of FIG. 2

FIG. 2 is a perspective view of the lens unit according to Embodiment 1. FIG. 3 is a cross-sectional view illustrating the lens unit according to Embodiment 1 in the sub-scanning direction, taken along a line A-A1 of FIG. 2. A lens unit 2 includes a lens body 8 that extends in the main scanning direction and condenses the reflected light reflected by the reading surface of the document M, a housing 9 to which the light source units 3 and 4, the sensor unit 7 and the lens body 8 are fixed, a light shield 10 blocking light from entering into the sensor unit 7 side from between side surfaces of the lens body 8 in the main scanning direction and the housing 9 and attaching the lens body 8 to the case 9 along the main scanning direction, and lens holders 11 and 12 blocking light at the corresponding end of both ends of the lens body 8 in the main scanning direction. The light shield 10 and the lens holders 11 and 12 block vertically-directed light emitted from the document M side to the sensor unit 7 side such that the light passes through only the lens body 8.

The housing 9 is formed of a sheet metal and has a box-like shape. The housing 9 includes a bottom 9f, a pair of main scanning direction side walls 9h, a pair of transparent plate fixing portions 9j that are continuous with the main scanning direction side walls 9h, and a pair of sub-scanning direction side walls 9g. The main scanning direction side walls 9h are provided upwards from both ends of the bottom 9f in the sub-scanning direction by bending by 90 degrees with respect to the bottom 9f and extend in the main scanning direction. The transparent plate fixing portions 9j are formed at ends of the main scanning direction side walls 9h in the vertical direction so as to bend by 90 degrees with respect to the main scanning direction side walls 9h and extend in the main scanning direction. The sub-scanning direction side walls 9g are provided upwards from both ends of the bottom 9f in the main scanning direction by bending by 90 degrees with respect to the bottom 9f and extend in the sub-scanning direction.

The bottom 9f of the housing 9 includes, at the central part thereof in the sub-scanning direction, a slit section 9e extending in the main scanning direction. The housing 9 includes lens body fixing portions 9a and 9b that serve as a pair of lens body fixing portions provided upwards from both ends of the slit section 9e in the sub-scanning direction by bending to incline at an angle greater than 0 degrees and less than 90 degrees with respect to the bottom 9f and extend in the main scanning direction. Each of the angles of the lens body fixing portions 9a and 9b with respect to the bottom 9f is preferably greater than 45 degrees and less than 90 degrees.

The lens body 8 includes a lens array, such as a rod lens array and a microlens array, to focus the light reflected by the reading surface of the document M and entering into the lens body 8 onto a light receiver 13 formed on the sensor unit 7. That is to say, the light receiver 13 is positioned in alignment with the optical axis of the lens body 8. Although Embodiment 1 of the present disclosure describes a case of employing a lens that focuses an image with erecting equal magnification as the lens body 8, a lens that focuses an image at other than with erecting equal magnification may also be employed depending on the specification of the image reading device 100.

The light guide 5 is made of, for example, a transparent resin, and emits light onto the reading surface of the document M with the light propagating in the main scanning direction. The light guide 6 has the same structure and function as those of the light guide 5. The light guide 5 and the light guide 6 are arranged in parallel to face each other in the sub-scanning direction with the lens body 8 sandwiched therebetween. The light guide 5 and the light guide 6 are arranged symmetrically with respect to the lens body 8 in the sub-scanning direction.

Each of the light guides 5 and 6 includes incident surfaces on both ends thereof in the main scanning direction into which light emitted by the light source units 3 and 4 enters, an emission surface that emits the light entering into the incident surfaces to the document M that is an object to be read, a reflective surface that has a parabolic shape and reflects toward the emission surface light from a focal point of the parabolic shape or light from a predetermined area passing through the focal point, a planar-shaped inclined surface facing the reflective surface, and a light scatterer that scatters the light entering from the incident surfaces to reflect the light entering from the incident surfaces to a scattering region including the focal point of the parabolic shape of the reflective surface.

Figure 4A:
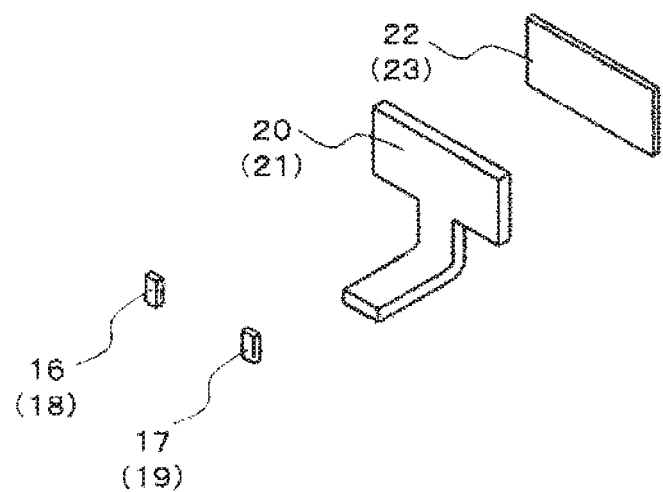
FIG. 4A is an exploded perspective view of a light source unit according to Embodiment 1.
Figure 4B:
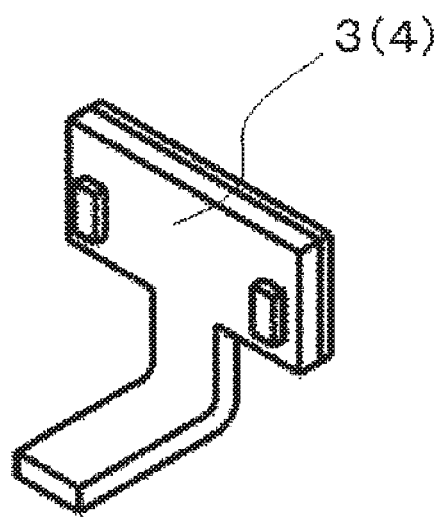
FIG. 4B is a perspective view of the light source unit according to Embodiment 1.

FIG. 4A is an exploded perspective view of a light source unit according to Embodiment 1. FIG. 4B is a perspective view of the light source unit according to Embodiment 1. The light source units 3 and 4 have the same configuration. The light source unit 3 (4) is arranged to face the corresponding end surfaces of the light guides 5 and 6 in the main scanning direction. The light source unit 3 (4) includes light sources 16 (18) and 17 (19) such as LEDs that project light into the light guides 5 and 6, a light source board 20 (21) on which is mounted the light sources 16 (18) and 17 (19), a heat conductor 22 (23) that is in close contact with a surface of the light source board 20 (21) opposite from the surface on which the light sources 16 (18) and 17 (19) are mounted and that improves thermal conductivity of the light source board 20 (21). As illustrated in FIG. 1, each of the light source units 3 and 4 is arranged at the corresponding ends of the light guides 5 and 6 in the main scanning direction and are fixed respectively by light guide holders 14 and 15 for holding the light guides 5 and 6. The light guide holders 14 and 15 are fixed to the lens unit 2 such that the heat conductors 22 and 23 of the light source units 3 and 4 are in contact with the housing 9.

The light guides 5 and 6 are made of a transparent resin, extend in the main scanning direction in parallel to each other, and are arranged symmetrically with respect to the lens body 8 sandwiched therebetween. The light guides 5 and 6 are not necessarily parallel to each other across the entire length in the main scanning direction. The light guides 5 and 6 are preferably made of a polymethylmethacrylate (PMMA) having a high oil resistance when a possibility exists that the light guides are exposed and directly touch the skin. In the case of a configuration in which the transparent plate 1 is attached and fixed to prevent a direct contact with the skin, the light guides 5 and 6 may be made of a cycloolefin resin or polycarbonate instead of a PMMA, provided that the resin is treated appropriately.

Figure 5:
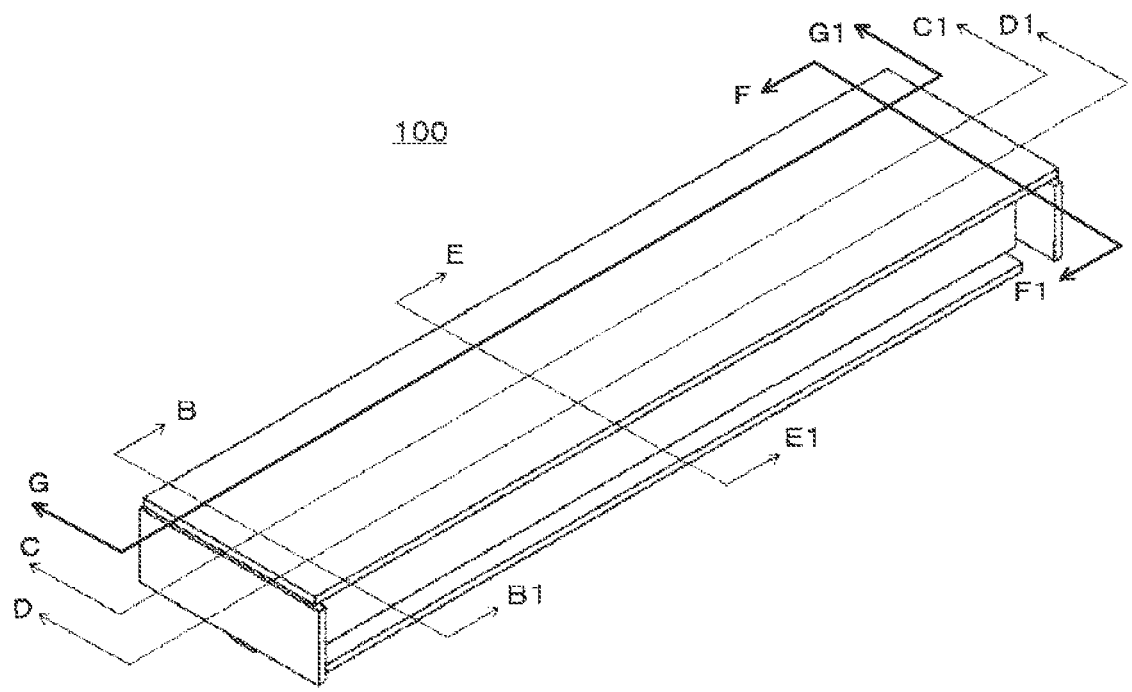
FIG. 5 is an external view of the image reading device according to Embodiment 1.
Figure 6:
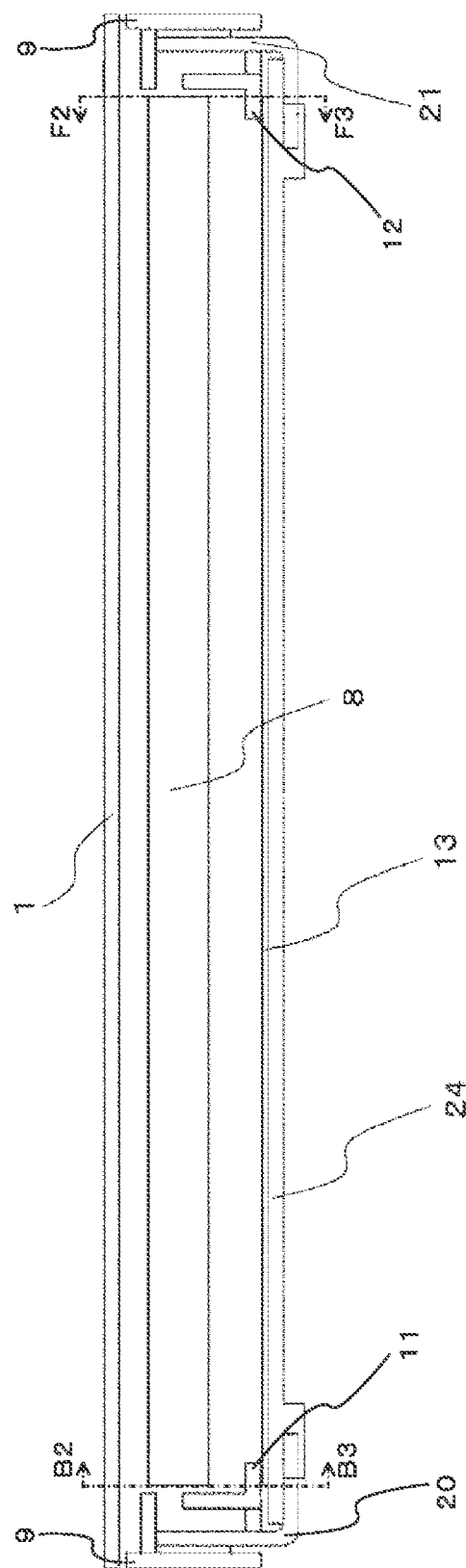
FIG. 6 is a cross-sectional view illustrating the image reading device according to Embodiment 1 in a main scanning direction, taken along a line C-C1 of FIG. 5.
Figure 9A:
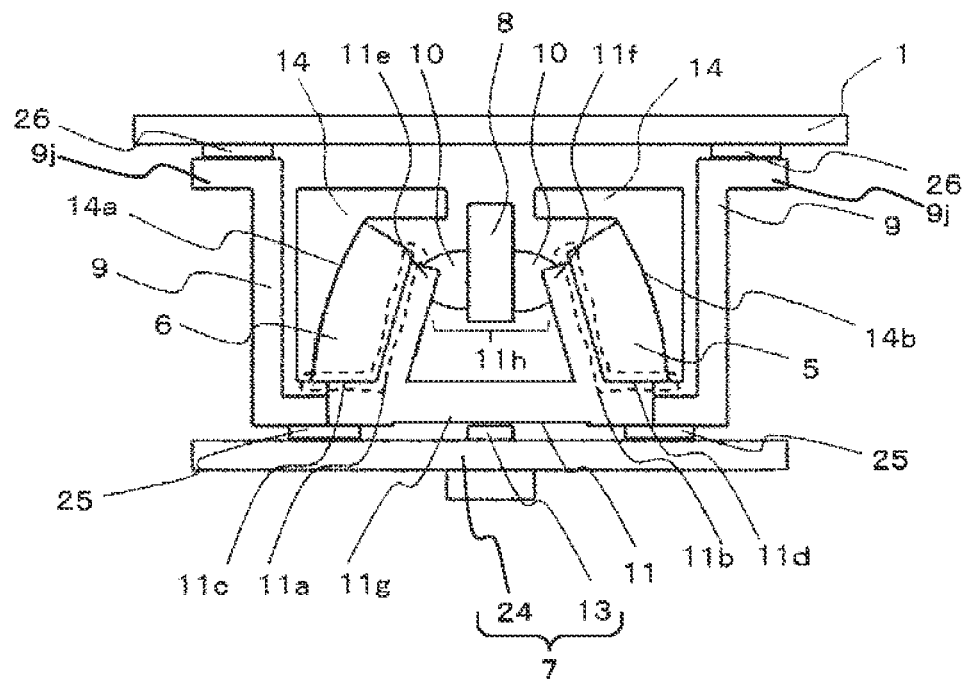
FIG. 9A is a cross-sectional view illustrating the image reading device according to Embodiment 1 in the sub-scanning direction, taken along a line B-B1 of FIG. 5 and a line B2-B3 of FIG. 6.
Figure 9B:
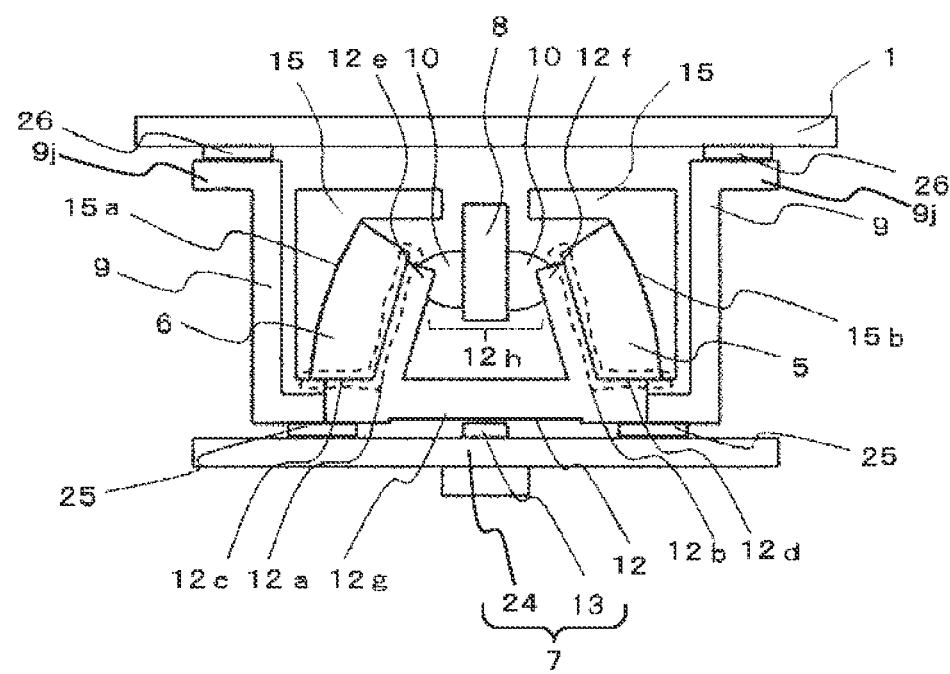
FIG. 9B is a cross-sectional view illustrating the image reading device according to Embodiment 1 in the sub-scanning direction, taken along a line F-F1 of FIG. 5 and a line F2-F3 of FIG. 6.
Figure 10A:
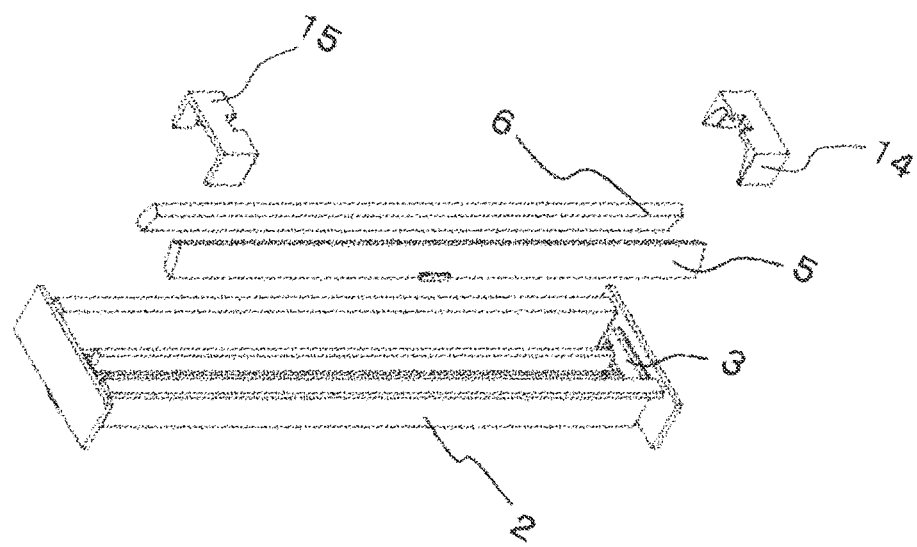
FIG. 10A is an exploded perspective view of the lens unit and light guides according to Embodiment 1.
Figure 10B:
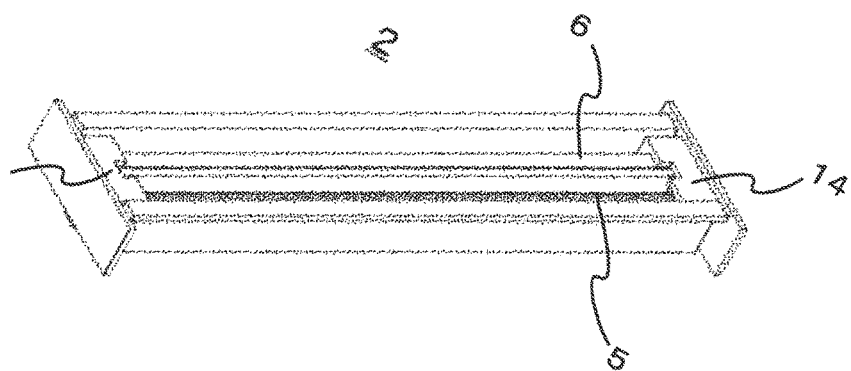
FIG. 10B is a perspective view of the lens unit and the light guides according to Embodiment 1.

FIG. 5 is an external view of the image reading device according to Embodiment 1. FIG. 6 is a cross-sectional view illustrating the image reading device according to Embodiment 1 in the main scanning direction, taken along a line C-C1 of FIG. 5. FIG. 9A is a cross-sectional view illustrating the image reading device according to Embodiment 1 in the sub-scanning direction, taken along a line B-B1 of FIG. 5 and a line B2-B3 of FIG. 6. FIG. 9B is a cross-sectional view illustrating the image reading device according to Embodiment 1 in the sub-scanning direction, taken along a line F-F1 of FIG. 5 and a line F2-F3 of FIG. 6.

The lens holders 11 and 12 are arranged at both ends of the slit section 9e of the housing 9. As illustrated in FIG. 9A, the lens holder 11 includes a holder bottom 11g, light guide positioners 11a and 11b, and lens body holders 11e and 11f. As illustrated in FIG. 9B, the lens holder 12 includes a holder bottom 12g, light guide positioners 12a and 12b, and lens body holders 12e and 12f. The lens holders 11 and 12 are fitted into holes on the bottom 9f of the housing 9, and the holder bottoms 11g and 12g are exposed at the bottom 9f.

The lens body holders 11e and 11f serve as a pair of inclined walls provided upwards from the holder bottom 11g toward the document M and inclined in the sub-scanning direction at an angle greater than 0 degrees and less than 90 degrees with respect to the holder bottom 11g. Each of the angles of the lens body holders 11e and 11f is preferably greater than 45 degrees and less than 90 degrees. Document-side ends of the inclined walls are separated from each other. The space of this separation is hereinafter referred to as a holder slit section 11h. The lens body holders 11e and 11f are formed symmetrically with respect to the holder slit section 11h in the sub-scanning direction and extend from one end in the main scanning direction to a predetermined position in the direction of the other end. The space between the lens body holders 11e and 11f in the sub-scanning direction narrows from the holder bottom 11g side to the document M side. That is to say, each of the lens body holders 11e and 11f inclines in the sub-scanning direction toward the opposing inclined wall side, that is, inclines inwardly.

Similarly, the lens body holders 12e and 12f serve as a pair of inclined walls provided upwards from the holder bottom 12g toward the document M and inclined in the sub-scanning direction at an angle greater than 0 degrees and less than 90 degrees with respect to the holder bottom 12g. Each of the angles of the lens body holders 12e and 12f is preferably greater than 45 degrees and less than 90 degrees. Document-side ends of the inclined walls are separated from each other. The space of this separation is hereinafter referred to as a holder slit section 12h. The lens body holders 12e and 12f are formed symmetrically with respect to the holder slit section 12h in the sub-scanning direction and extend from one end in the main scanning direction to a predetermined position in the direction of the other end. The space between the lens body holders 12e and 12f in the sub-scanning direction narrows from the holder bottom 12g side to the document M side. That is to say, each of the lens body holders 12e and 12f inclines in the sub-scanning direction toward the opposing inclined wall side, that is, inclines inwardly.

The lens body 8 is attached to the lens body holders 11e and 11f of the lens holder 11 and on the lens body holders 12e and 12f of the lens holder 12 by way of the light shield 10 having adhesion function.

A sensor board 24 is attached to the holder bottom 11g of the lens holder 11 and the holder bottom 12g of the lens holder 12 such that the light receiver 13 or a line extending from the light receiver 13 in the main scanning direction aligns with the holder slit sections 11h and 12h.

The lens holder 11 includes a holder bottom protrusion 11c that is continuous with the lens body holder 11e and protrudes from an intersection of the holder bottom 11g with the lens body holder 11e in the sub-scanning direction, and a holder bottom protrusion 11d that is continuous with the lens body holder 11f and protrudes from an intersection of the holder bottom 11g with the lens body holder 11f in the sub-scanning direction. The lens holder 12 includes a holder bottom protrusion 12c that is continuous with the lens body holder 12e and protrudes from an intersection of the holder bottom portion 12g with the lens body holder 12e in the sub-scanning direction, and a holder bottom protrusion 12d that is continuous with the lens body holder 12f and protrudes from an intersection of the holder bottom portion 12g with the lens body holder 12f in the sub-scanning direction. The light guide 5 is attached to the light guide positioner 11b of the lens holder 11 that includes the lens body holder 11f and the holder bottom protrusion 11d, and to the light guide positioner 12b of the lens holder 12 that includes the lens body holder 12f and the holder bottom protrusion 12d. The light guide 6 is attached to the light guide positioner 11a of the lens holder 11 that includes the lens body holder 11e and the holder bottom protrusion 11c, and to the light guide positioner 12a of the lens holder 12 that includes the lens body holder 12e and the holder bottom protrusion 12c. A surface of each of the light guide positioners 11b and 12b that faces the light guide 5 to be attached has at least a portion having a same shape as a shape of a surface of the light guide 5, and a surface of each of the light guide positioners 11a and 12a that faces the light guide 6 to be attached has at least a portion having a same shape as a shape of a surface of the light guide 6.

The light guide holder 14 includes light guide holding parts 14a and 14b, and the light guide holder 15 includes light guide holding parts 15a and 15b. The light guide holding part 14a forms a thorough-hole penetrating from an end surface of the light guide 5 to the light source 16. Similarly, the light guide holding part 14b forms a thorough-hole penetrating from an end surface of the light guide 6 to the light source 17. The light guide holding part 15a forms a thorough-hole penetrating from an end surface of the light guide 5 to the light source 18. Similarly, the light guide holding part 15b forms a thorough-hole penetrating from an end surface of the light guide 6 to the light source 19.

The lens holder 11 includes the light guide positioners 11a and 11b, and the lens holder 12 includes the light guide positioners 12a and 12b. Each surface of the light guide positioners 11a and 11b has the same shape as the corresponding surface of the light guides 5 and 6 attached thereto. Similarly, each surface of the light guide positioners 12a and 12b has the same shape as the corresponding surface of the light guides 5 and 6 attached thereto.

As illustrated in FIGS. 9A, 9B, 10A, and 10B, by insertion of the light guide holders 14 and 15 from the document M side in the vertical direction, the light guide 5 is positioned by the light guide holding part 14a, the light guide holding part 15a, the light guide positioner 11a of the lens holder 11, and the light guide positioner 12a of the lens holder 12. Similarly, by insertion of the light guide holders 14 and 15 from the document M side in the vertical direction, the light guide 6 is positioned by the light guide holding part 14b, the light guide holding part 15b, the light guide positioner 11b of the lens holder 11, and the light guide positioner 12b of the lens holder 12. Each surface of the light guide holding parts 14a and 14b has the same shape as the facing surface of the light guides 5 and 6 attached thereto. Similarly, each surface of the light guide holding parts 15a and 15b has the same shape as of the facing surface of the light guides 5 and 6 attached thereto. Due to positioning in this manner, the light guides 5 and 6 are held by the lens holder 11.

The light guides 5 and 6 are sandwiched between the corresponding positioners of light guide positioners 11a and 11b of the lens holder 11, the light guide positioners 12a and 12b of the lens holder 12, the light guide holding part 14a of the light guide holder 14, and the light guide holding part 15a of the light guide holder 15, and are held by the lens holders 11 and 12.

A change in an outside temperature may cause the light guides 5 and 6 and the lens unit 2 to have different lengths in the main scanning direction due to differences in the coefficient of linear expansion. Thus, to press the light guides 5 and 6 by the light guide holding parts 14a and 14b and the light guide holding parts 15a and 15b and prevent buckling of the light guides 5 and 6, the light guide holders 14 and 15 are desirably made of a material having low rigidity. A configuration in which a part of light guide holders and light guide holding parts are made of a material having low rigidity such as a silicon resin may be used as required.

The light guide holding parts 14a and 14b and the light guide holding parts 15a and 15b may be configured to allow light to pass through end surfaces of the light guides 5 and 6 in the main scanning direction in contact with the light guide holders 14 and 15 and surfaces of the light guide holders 14 and 15 each facing the corresponding end surface of the light guides 5 and 6, that is, surfaces at the light sources 16, 17, 18 and 19 sides. That is to say, the light guide holding parts 14a and 14b and the light guide holding parts 15a and 15b do not need to have a configuration by which the light guide holders 14 and 15 and the light guides 5 and 6 physically communicate, as long as these sections are made of a material that allows light emitted by the light sources 16 and 18 and the light sources 17 and 19 to enter into the light guides 5 and 6. For example, in the case in which the light guide holding parts 14a and 14b and the light guide holding parts 15a and 15b are formed as through-holes, a transmission material for propagation of light to the light guides 5 and 6 may be inserted into the light guide holders 14 and 15. Needless to say, although the light sources 16 and 18 are respectively arranged on two end surfaces of the light guide 5 in the main scanning direction and the light sources 17 and 19 are respectively arranged on two end surfaces of the light guide 6 in the main scanning direction, a configuration in which only the light source 16 is arranged on one end surface of the light guide 5 in the main scanning direction and only the light source 17 is arranged on one end surface of the light guide 6 in the main scanning direction may be employed.

Again with reference to FIGS. 4A and 4B, each of the light sources 16 and 18 is a light source element such as an LED that projects light onto the corresponding end surface of two end surfaces of the light guide 5 facing each other in the main scanning direction. Similarly, each of the light sources 17 and 19 is a light source element such as a LED that projects light onto the corresponding end surface of two end surfaces of the light guide 6 facing each other in the main scanning direction. Each of the light sources 16, 17, 18 and 19 is a resin molded LED or a bare chip LED.

A photoelectric conversion output of the light receiver 13 is preferably of a level sufficient to enable a wide dynamic range. However, driving current of the light sources 16, 17, 18 and 19 is to be increased to ensure a wide dynamic range during high-speed driving of the reading operation of the document M. In such a case, the increased driving current of the light sources 16, 17, 18 and 19 generates more heat.

To improve dissipation efficiency of the heat generated by the light sources 16, 17, 18 and 19, a configuration using the heat conductors 22 and 23 is to be employed. Specifically, as illustrated in FIG. 4A, the heat conductor 22 is arranged on a surface of the light source board 20 opposite from the surface of the light source board 20 on which the light sources 16 and 17 are mounted, and is in close contact with the light source board 20. The heat conductor 22 conducts the heat generated on the light source board 20 to the housing 9, thereby diffusing the heat on the housing 9 that is made of a metal and radiating the heat to the outside.

The heat conductor 23 is arranged on a surface of the light source board 21 opposite from the surface of the light source board 21 on which are mounted the light sources 18 and 19, and is in close contact with the light source board 21. The heat conductor 23 conducts the heat generated on the light source board 21 to the housing 9, thereby diffusing the heat on the housing 9 that is made of a metal and radiating the heat to the outside. As described above, employing a configuration for efficient heat dissipation leads to an increase in the driving current of the light sources 16, 17, 18 and 19, thereby enabling high-speed driving of the reading operation of the document M.

Again with reference to FIG. 1, the sensor unit 7 includes the sensor board 24 on which is mounted the light receiver 13. The light receiver 13 includes an optical sensor IC and extends in the main scanning direction to have a length equal to or greater than a reading length of the document M. The light receiver 13 receives the light condensed by the lens body 8 and performs photoelectric conversion of the light. The sensor board 24 is a circuit board on which is mounted the light receiver 13 that is a light receiving element, and includes a non-illustrated connector connectable to the outside. The connector outputs to the outside of the sensor board 24 an electrical signal, as an image signal, obtained by the photoelectric conversion by the light receiver 13 mounted on the sensor board 24. As illustrated in FIGS. 9A and 9B, a board fixing member 25 fixes the sensor unit 7 on the opposite surface of the housing 9 from the surface of the housing 9 facing the reading surface of the document M.

The transparent plate 1 is fixed to the transparent plate fixing portion 9j of the housing 9 by way of a transparent plate fixing member 26. Needless to say, the transparent plate 1 need not be fixed to the image reading device, and is omittable if not necessary.

Next, positioning of each component of the lens unit 2 is explained with reference to FIGS. 1, 2, 3 and 6. FIG. 6 is a cross-sectional view illustrating the image reading device according to Embodiment 1 in the main scanning direction, taken along a line C-C1 of FIG. 5.

The lens holders 11 and 12 are fixed, using a material such as an adhesive, to the bottom 9f of the housing 9 at both ends in the main scanning direction of the slit section 9e extending in the main scanning direction of the housing 9 so as to touch the lens body fixing portions 9a and 9b. The lens body 8 is placed on the lens holders 11 and 12. The lens holders 11 and 12 have a lens body contact surface on which the lens body 8 can be temporarily placed in preparation for assembly during fixing of the lens body 8 to the housing 9. The lens body contact surface may be positioned with respect to a height direction standard of the lens body 8 according to a necessary resolution requirement.

FIG. 3 is a cross-sectional view illustrating the lens unit according to Embodiment 1 in the sub-scanning direction, taken along a line A-A1 of FIG. 2. In FIG. 3, the lens body 8 is fixed at the central part of the housing 9 in the sub-scanning direction to the lens body fixing portions 9a and 9b using the light shield 10. The light shield 10 is a shielding member for shielding portions at which the distance between the lens body 8 and the housing 9 in the sub-scanning direction changes across the main scanning direction, and is preferably made of a material that is liquid before curing and retains shape thereof when cured, such as an adhesive. The light shield 10 is applied from one end of each of the lens body fixing portions 9a and 9b in the main scanning direction to the other ends of the lens body fixing portions 9a and 9b in the main scanning direction opposite to the one end, thereby filling and covering gaps between the lens body 8 and the lens body fixing portions 9a and 9b.

The lens body fixing portions 9a and 9b have fixing portion ends 9c and 9d that are ends thereof in the sub-scanning direction. The fixing portion ends 9c and 9d are positioned between a lens body upper surface 8a and a lens body lower surface 8b in the vertical direction such that the light shield 10 does not protrude above the lens body upper surface 8a and below the lens body lower surface 8b side. The fixing portion ends 9c and 9d can have any length by employing a processing procedure of cutting the fixing portions ends after drawing out the sheet metal according to the length needed.

Figure 7:
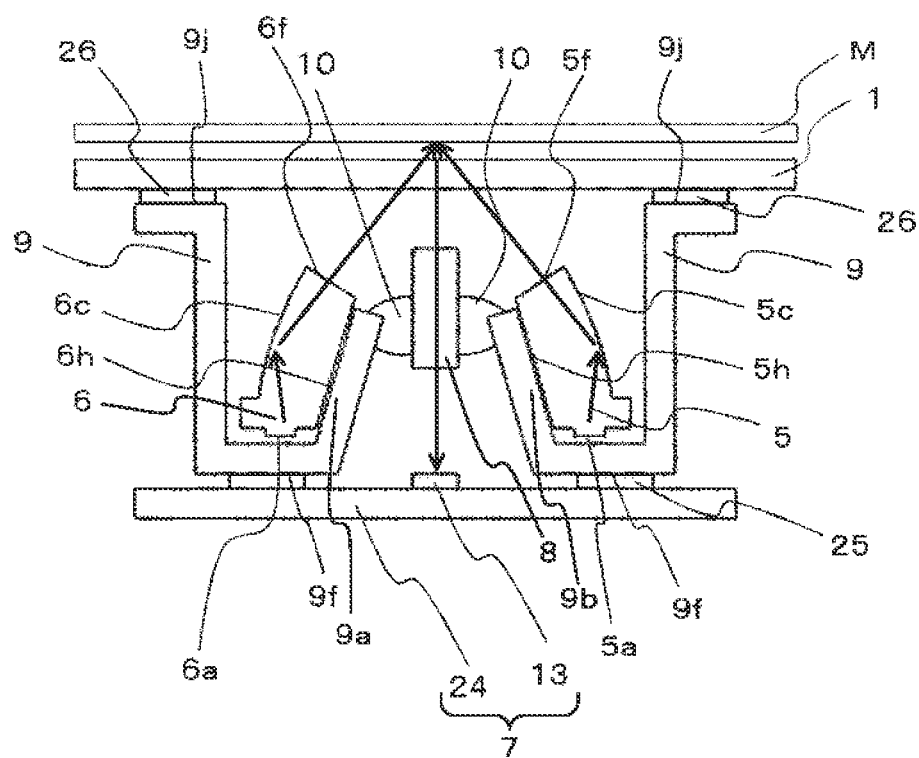
FIG. 7 is a cross-sectional view illustrating the image reading device according to Embodiment 1 in the sub-scanning direction, taken along a line E-E1 of FIG. 5.

FIG. 7 is a cross-sectional view illustrating the image reading device according to Embodiment 1 in the sub-scanning direction, taken along a line E-E1 of FIG. 5. In FIG. 7, positioning of the transparent plate 1, the sensor unit 7, and the lens body 8 in the vertical direction and the sub-scanning direction is performed using, for example, a jig. Fixing of the transparent plate 1 to the transparent plate fixing portion 9j need not be completed by one application of the transparent fixing member 26 in the main scanning direction, and several applications of the transparent plate fixing member 26 may be performed to fix the transparent plate 1 to the transparent plate fixing portion 9j, if necessary. Similarly, fixing of the sensor unit 7 to the bottom 9f need not be completed by one application of the board fixing member 25 in the main scanning direction, and several applications of the light shield 10 may be performed to fix the sensor unit 7 to the bottom 9f, if necessary. Similarly, fixing of the lens body 8 to the lens body fixing portions 9a and 9b need not be completed by one application of the light shield 10 in the main scanning direction, and several applications of the light shield 10 may be performed to fix lens body 8 to the lens body fixing portions 9a and 9b, if necessary.

Performing the positioning of the transparent plate 1, the sensor unit 7, and the lens body 8 in the vertical direction and the sub-scanning direction based on the positions of the light guide positioners 11a and 11b of the lens holder 11 and the light guide positioners 12a and 12b of the lens holder 12 enables highly accurate assembly that is only affected by assembly variance and not affected by differences in dimensions of each component. Thus, an assembly that enables uniform emission of light to a region to be illuminated and less variance in resolution can be achieved.

Figure 8A:
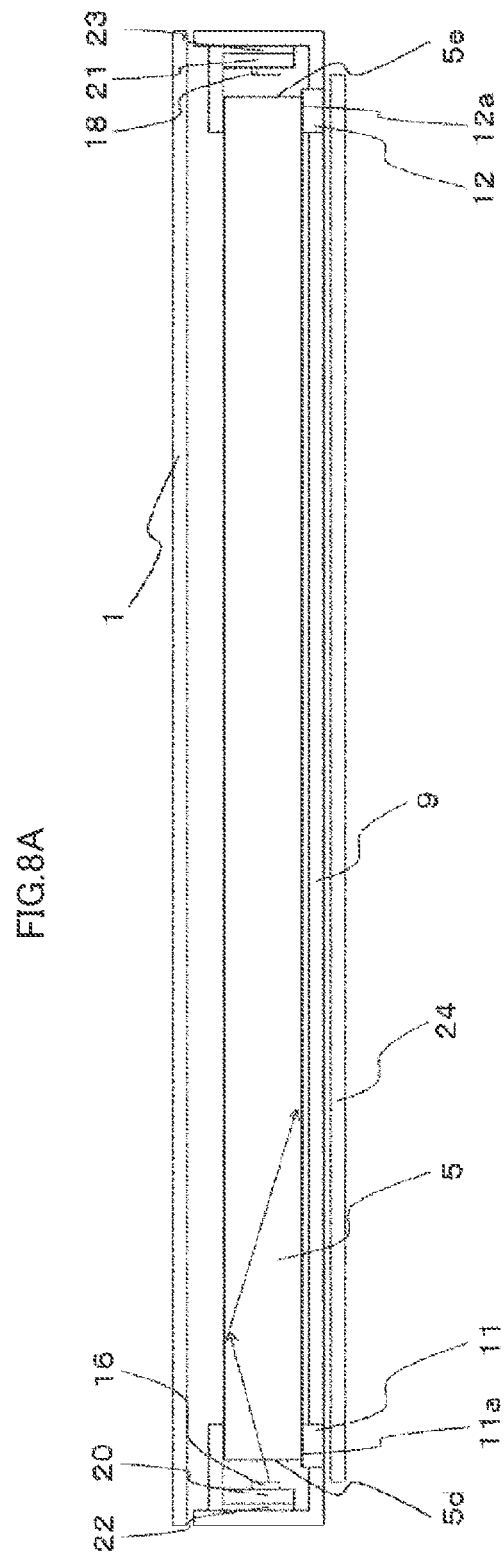
FIG. 8A is a cross-sectional view illustrating the image reading device according to Embodiment 1 in the main scanning direction, taken along a line D-D1 of FIG. 5.

Next, a form of light propagation in the image reading device 100 is explained with reference to FIGS. 7, 8A, and 8B. FIG. 8A is a cross-sectional view illustrating the image reading device according to Embodiment 1 in the main scanning direction, taken along a line D-D1 of FIG. 5. In FIGS. 7, 8A, and 8B, solid line arrows show an optical path.

As illustrated in FIGS. 7 and 8A, the light guide 5 includes incident surfaces 5d and 5e on both ends thereof in the main scanning direction into which light emitted by the light sources 16 and 18 enters, an emission surface 5f that emits the light entering into the incident surfaces 5d and 5e exits to the document M that is an object to be read, a reflective surface 5c that has a parabolic shape and reflects toward the emission surface 5f light from a focal point of the parabolic shape or light from a predetermined area passing through the focal point, an a planar-shaped inclined surface 5h facing the reflective surface 5c, and a light scatterer 5a that scatters the light entering from the incident surfaces to reflect the light to a scattering region including the focal point of the parabolic shape of the reflective surface. As illustrated in FIGS. 7 and 8B, the light guide 6 includes incident surfaces 6d and 6e on both ends thereof in the main scanning direction into which light emitted by the light sources 17 and 19 enters, an emission surface 6f that emits the light entering into the incident surfaces 6d and 6e exits to the document M that is an object to be read, a reflective surface 6c that has a parabolic shape and reflects toward the emission surface 6f a light from a focal point of the parabolic shape or a light from a predetermined area passing through the focal point, a planar-shaped inclined surface 6h facing the reflective surface 6c, and a light scatterer 6a that scatters the light entering from the incident surfaces to reflect the light to a scattering region including the focal point of the parabolic shape of the reflective surface.

As illustrated in FIGS. 7, 9A, and 9B, the planar-shaped inclined surface 5h of the light guide 5 faces planar-shaped inclined walls of the lens body holders 11e and 11f, the planar-shaped inclined surface 6h of the light guide 6 faces planar-shaped inclined walls of the lens body holders 12e and 12f, the light scatterer 5a of the light guide 5 faces the holder bottom protrusions 11d and 12d, and the light scatterer 6a of the light guide 6 faces the holder bottom protrusions 11c and 12c, thereby attaching the light guides 5 and 6 to the lens holders 11 and 12.

In FIGS. 7 and 8A, light that enters into the light guide 5 from the light source 16 facing one end surface of the light guide 5 in the main scanning direction is guided through the interior of the light guide 5 and travels in the main scanning direction through the interior of the light guide 5 by repeated reflection by the wall surfaces of the light guide 5. Light entering into the light guide 5 from the light source 18 facing another end surface of the light guide 5 in the main scanning direction is guided in the light guide 5 toward a direction opposite to the direction in which the light from the light source 16 travels, and travels in the main scanning direction through the interior of the light guide 5 by repeated reflection by the wall surfaces of the light guide 5. Projecting light from both ends of the light guide 5 in the main scanning direction to the opposite ends enables irradiation with uniform light across the entire length of the light guide 5 in the main scanning direction that is the longitudinal direction of the light guide 5. Then, the light guided in the light guide 5 scatters at the light scatterer 5a having a white printed pattern or a concavo-convex shape formed along the main scanning direction that is the longitudinal direction of the light guide 5, and reflects from the reflective surface 5c of the light guide 5, and thus as indicated by the arrow in FIG. 7, line light is emitted from the emission surface 5f opposing the light scatterer 5a to the document M in contact with the transparent plate 1.

Similarly, in FIGS. 7 and 8B, light that enters into the light guide 6 from the light source 17 facing one end surface of the light guide 6 in the main scanning direction is guided through the interior of the light guide 6 and travels in the main scanning direction through the interior of the light guide 6 by repeated reflection by the wall surfaces of the light guide 6. Light entering into the light guide 6 from the light source 19 facing another end surface of the light guide 6 in the main scanning direction is guided in the light guide 6 toward a direction opposite to the direction in which the light from the light source 17 travels, and travels in the main scanning direction through the interior of the light guide 6 by repeated reflection by the wall surfaces of the light guide 6. Projecting light from both ends of the light guide 6 in the main scanning direction to the opposite ends enables irradiation with uniform light across the entire length of the light guide 6 in the main scanning direction that is the longitudinal direction of the light guide 6. Then, the light guided in the light guide 6 scatters at the light scatterer 6a having a white printed pattern or a concavo-convex shape formed along the main scanning direction that is the longitudinal direction of the light guide 6, and reflects from the reflective surface 6c of the light guide 6, and thus as indicated by the arrow in FIG. 7, line light is emitted from the emission surface 6f opposing the light scatterer 6a to the document M in contact with the transparent plate 1.

The lens body 8 condenses the light emitted as line light from the light guides 5 and 6 onto the reading surface of the document M and diffusely reflected by the document M. The light receiver 13 receives the light condensed by the lens body 8 on a light receiving surface thereof, and performs photoelectric conversion of the light.

Therefore, performing positioning of the transparent plate 1, the sensor unit 7, and the lens body 8 in the vertical direction and the sub-scanning direction based on the positions of the light guide positioners 11a, 11b, 12a and 12b enables a reduction in variance of assembly of the light guides 5 and 6 and the transparent plate 1, provide uniform light, and reduces variance in assembly of the transparent plate 1, the sensor unit 7 and the lens body 8. Thus even when employing a housing that is made economically by processing sheet metal, such configuration allows the obtaining of an image reading device having higher lighting performance and resolution performance than the conventional image reading device that includes a housing made by highly accurate metal casting or resin molding. This results in the obtaining of an image reading device that has less variance in image reading performance.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-002415, filed on Jan. 11, 2018, the entire disclosure of which is incorporated by reference herein.

REFERENCE SIGNS LIST

M Document
100 Image reading device
1 Transparent plate
2 Lens unit
3, 4 Light source unit
5, 6 Light guide
5a, 6a Light scatterer
5c, 6c Reflective surface
5d, 5e, 6d, 6e Incident surface
5f, 6f Emission surface
5h, 6h Inclined surface
7 Sensor unit
8 Lens body
8a Lens body upper surface
8b Lens body lower surface
9 Housing
9a, 9b Lens body fixing portion
9c, 9d Fixing portion end
9e Slit section
9f Bottom
9g Sub-scanning direction side wall
9h Main scanning direction side wall
9j Transparent plate fixing portion
10 Light shield
11, 12 Lens holder
11a, 11b, 12a, 12b Light guide positioner
11c, 11d, 12c, 12d Holder bottom protrusion
11e, 11f, 12e, 12f Lens body holder
11g, 12g Holder bottom
11h, 12h Holder slit section
13 Light receiver
14, 15 Light guide holder
14a, 14b, 15a, 15b Light guide holding part
16, 17, 18, 19 Light source
20, 21 Light source board
22, 23 Heat conductor
24 Sensor board
25 Board fixing member
26 Transparent plate fixing member

The invention claimed is:

1. An image reading device comprising:
a light guide extending in a main scanning direction and configured to emit light to an object to be read,
a lens body to focus reflected light reflected by the object to be read;
a light receiver to receive the reflected light focused by the lens body;
a sensor board on which the light receiver is mounted,
lens holders on which the light guide, the lens body, and the sensor board are mounted; and
a housing to house or hold the light guide, the lens body, the sensor board, and the lens holders,
wherein
the lens holders are disposed at both ends of the housing in the mam scanning direction and each includes elude a holder bottom, a light guide positioner, and lens body holders, the lens body is mounted on pairs of the lens body holders, each pair being provided upwards from the corresponding holder bottom toward the object to be read and extending in the main scanning direction, the sensor board is mounted on the holder bottoms such that the light receiver aligns with an optical axis of the lens body, the light guide is attached to the light guide positioners, the light guide positioners each comprising the lens body holder and a holder bottom protrusion continuous with the lens body holder and protruding in a sub-scanning direction from an intersection of the holder bottom with the lens body holder, and a surface of each light guide positioner that faces the light guide to be attached has at least a portion having a same shape as a shape of a surface of the light guide.

2. The image reading device according to claim 1, further comprising light guide holders to hold the light guide on the lens holders, the light guide being sandwiched between the light guide holders and the light guide positioners.

3. The image reading device according to claim 2, wherein the light guide comprises:
an incident surface disposed at an end of the light guide in the main scanning direction and into which light emitted from a light source enters;
an emission surface to emit light entering into the incident surface to the object to be read;
a reflective surface having a parabolic shape and configured to reflect light, toward the emission surface, from a focal point of the parabolic shape or from a predetermined area passing through the focal point;
a planar-shaped inclined surface facing the reflective surface; and
a light scatterer to scatter the light entering from the incident surface to reflect the light entering from the incident surface toward a scatter region including the focal point of the parabolic shape of the reflective surface.

4. The image reading device according to claim 3, wherein
the lens body holders serve as a pair of planar-shaped inclined walls, each being inclined upwards and inwardly of the pair at a predetermined angle in the sub-scanning direction and extending in the main scanning direction.

5. The image reading device according to claim 3, wherein
the lens body holders serve as a pair of planar-shaped inclined walls, each being inclined upwards and inwardly of the pair at a predetermined angle in the sub-scanning direction and extending in the main scanning direction, and
the light guide is attached to the lens holders such that
the planar-shaped inclined surface of the light guide and the corresponding planar-shaped inclined walls of the lens body holders face each other, and
the light scatterer of the light guide and the holder bottom protrusion face each other.

6. The image reading device according to claim 2, wherein
the lens body holders serve as a pair of planar-shaped inclined walls, each being inclined upwards and inwardly of the pair at a predetermined angle in the sub-scanning direction and extending in the main scanning direction.

7. The image reading device according to claim 1, wherein the light guide comprises:
an incident surface disposed at an end of the light guide in the main scanning direction and into which light emitted from a light source enters;
an emission surface to emit light entering into the incident surface to the object to be read;
a reflective surface having a parabolic shape and configured to reflect light, toward the emission surface, from a focal point of the parabolic shape or from a predetermined area passing through the focal point;
a planar-shaped inclined surface facing the reflective surface; and
a light scatterer to scatter the light entering from the incident surface to reflect the light entering from the incident surface toward a scatter region including the focal point f the parabolic shape of the reflective surface.

8. The image reading device according to claim 7, wherein
the lens body holders serve as a pair of planar-shaped inclined walls, each being inclined upwards and inwardly of the pair at a predetermined angle in the sub-scanning direction and extending in the main scanning direction, and
the light guide is attached to the lens holders such that
the planar-shaped inclined surface of the light guide and the corresponding planar-shaped inclined walls of the lens body holders face each other, and
the light scatterer of the light guide and the holder bottom protrusion face each other.

9. The image reading device according to claim 7, wherein
the lens body holders serve as a pair of planar-shaped inclined walls, each being inclined upwards and inwardly of the pair at a predetermined angle in the sub-scanning direction and extending in the main scanning direction.

10. The image reading device according to claim 1, wherein
the lens body holders serve as a pair of planar-shaped inclined walls, each being inclined upwards and inwardly of the pair at a predetermined angle in the sub-scanning direction and extending in the main scanning direction.

11. The image reading device according to claim 1, wherein the light guide positioners and the lens body holder ae a unitary part.

* * * * *